United States Patent
Hong (10) Patent No.: US 10,861,383 B2
(45) Date of Patent: Dec. 8, 2020

(54) DISPLAY APPARATUS, VEHICLE HAVING THE SAME AND METHOD FOR CONTROLLING DISPLAY APPARATUS

(71) Applicants: HYUNDAI MOTOR COMPANY, Seoul (KR); KIA MOTORS CORPORATION, Seoul (KR)

(72) Inventor: Youngwoo Hong, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/678,640

(22) Filed: Nov. 8, 2019

(65) Prior Publication Data

US 2020/0327849 A1 Oct. 15, 2020

(30) Foreign Application Priority Data

Apr. 10, 2019 (KR) .......................... 10-2019-0042134

(51) Int. Cl.
*G09G 3/32* (2016.01)
*F21V 8/00* (2006.01)
*H05B 47/11* (2020.01)

(52) U.S. Cl.
CPC .............. *G09G 3/32* (2013.01); *G02B 6/0028* (2013.01); *H05B 47/11* (2020.01); *G09G 2320/0626* (2013.01); *G09G 2320/0666* (2013.01)

(58) Field of Classification Search
CPC .............. G09G 3/32; G09G 2320/0626; G09G 2320/0666; H05B 47/11; G02B 6/0028
USPC .......................................................... 345/207
See application file for complete search history.

(56) References Cited

U.S. PATENT DOCUMENTS

| | | | | |
|---|---|---|---|---|
| 4,880,971 A | * | 11/1989 | Danisch ............... | G01F 23/292 340/619 |
| 2003/0095397 A1 | * | 5/2003 | McGowan ............ | G02F 1/1336 362/23.02 |
| 2004/0252940 A1 | * | 12/2004 | Atac .................. | G02B 27/0172 385/31 |
| 2007/0091635 A1 | * | 4/2007 | Ladouceur ............ | G02F 1/1336 362/557 |
| 2009/0213041 A1 | * | 8/2009 | Unger ................... | G02F 1/1336 345/52 |
| 2010/0141869 A1 | * | 6/2010 | Biernath ............... | G02F 1/1336 349/64 |
| 2013/0050165 A1 | * | 2/2013 | Northway ............... | G09G 5/02 345/207 |
| 2014/0192092 A1 | * | 7/2014 | Aruga ................. | G02B 27/017 345/690 |

FOREIGN PATENT DOCUMENTS

KR   10-0739787   7/2007

* cited by examiner

*Primary Examiner* — Mark Edwards
(74) *Attorney, Agent, or Firm* — Brinks Gilson & Lione

(57) ABSTRACT

A vehicle includes: a display panel; a backlight unit disposed at a rear part of the display panel to supply light to the backlight unit; a light collector to collect external light and connected to the backlight unit; a light blocking device disposed between the backlight unit and the light collector to pass or block light; and a controller to determine whether an external light use condition is satisfied based on illuminance of the external light, and open the light blocking device so that the external light is transmitted to the backlight unit when the external light use condition is satisfied.

22 Claims, 12 Drawing Sheets

DISPLAY APPARATUS, VEHICLE HAVING THE SAME AND METHOD FOR CONTROLLING DISPLAY APPARATUS

CROSS-REFERENCE TO RELATED APPLICATION

This application claims priority to and the benefit of Korean Patent Application No. 10-2019-0042134, filed on Apr. 10, 2019, the entire contents of which are incorporated herein by reference.

FIELD

The present disclosure relates to a display apparatus, a vehicle having the same and a method for controlling the display apparatus.

BACKGROUND

The statements in this section merely provide background information related to the present disclosure and may not constitute prior art.

A display device is provided in a vehicle to display a navigation screen, a screen representing various information related to the vehicle, a screen for performing an audio or video function, and the like, Recently, the display device provided in the vehicle mainly uses LEDs as a light source of a backlight unit.

Since the display device provided in the vehicle mainly operates under natural light, visibility may be degraded by direct sunlight or reflected light. In order to improve the visibility, the brightness of the LED used as the light source of the backlight unit is being increased, but problems such as deterioration of the LED life and heat generation caused by the increase in luminance, and differences in color temperature according to the LED specifications occur.

SUMMARY

The present disclosure provides a display apparatus, a vehicle having the same and a method for controlling the display apparatus which improves visibility by using natural light, which is an infinite resource, as a light source of a backlight unit, and solve problems such as deterioration of life of an LED light source, heat generation, and the like.

Additional aspects of the present disclosure will be set forth in part in the description which follows and, in part, will be obvious from the description, or may be learned by practice of the present disclosure.

In accordance with an aspect of the disclosure, a vehicle includes: a display panel; a backlight unit disposed at a rear part of the display panel and configured to supply light to the backlight unit; a light collector configured to collect external light and connected to the backlight unit; a light blocking device disposed between the backlight unit and the light collector and configured to pass or block light; and a controller configured to determine whether an external light use condition is satisfied based on illuminance of the external light, and open the light blocking device so that the external light is transmitted to the backlight unit when the external light use condition is satisfied.

In one form, the display apparatus may further comprise an auxiliary light source configured to supply light to the backlight unit, and the controller is configured to turn off the auxiliary light source when the external light use condition is satisfied, and turn on the auxiliary light source when the external light use condition is not satisfied.

The controller may be configured to close the light blocking device to prevent light leakage of the auxiliary light source when the external light use condition is not satisfied.

The controller may be configured to turn on the auxiliary light source and open the light blocking device when the illuminance of the external light is less than a first reference value and equal to or greater than a second reference value.

The controller may be configured to adjust illuminance of the auxiliary light source to be lower as the illuminance of the external light becomes higher.

The controller may be configured to determine that the external light use condition is satisfied when the illuminance of the external light is equal to or greater than a reference value, and determine that the external light use condition is not satisfied when the illuminance of the external light is less than the reference value.

The controller may be configured to control the light blocking device based on the illuminance of the external light to adjust an amount of the light transmitted to the backlight unit when the external light use condition is satisfied.

The controller may be configured to open the light blocking device so that the external light passes the light blocking device when a color temperature of the external light is within a predetermined range, and close the light blocking device to block the external light when the color temperature of the external light is out of the predetermined range.

The display apparatus may further include an optical sensor configured to measure the illuminance of the external light.

The controller may be configured to determine the illuminance of the external light based on at least one of location information of a vehicle including the display apparatus, weather information, a captured external image or time information.

The display apparatus may further include a color thermometer configured to measure the color temperature of the external light.

The controller may be configured to determine the color temperature of the external light based on the captured external image.

The light collector may include at least one optical fiber having a surface to which a corrosion treatment is applied.

In accordance with another embodiment, a vehicle includes: a display panel; a backlight unit disposed at a rear part of the display panel and configured to supply light to the backlight unit; a light collector configured to collect external light and connected to the backlight unit; a light blocking device disposed between the backlight unit and the light collector and configured to pass or block light; and a controller configured to determine whether an external light use condition is satisfied based on illuminance of the external light, and open the light blocking device so that the external light is transmitted to the backlight unit when the external light use condition is satisfied.

The vehicle may further include an auxiliary light source configured to supply light to the backlight unit, and the controller is configured to turn off the auxiliary light source when the external light use condition is satisfied, and turn on the auxiliary light source when the external light use condition is not satisfied.

The controller may be configured to close the light blocking device to prevent light leakage of the auxiliary light source when the external light use condition is not satisfied.

The controller may be configured to determine that the external light use condition is satisfied when the illuminance of the external light is equal to or greater than a reference value, and determine that the external light use condition is not satisfied when the illuminance of the external light is less than the reference value.

The controller may be configured to open the light blocking device so that the external light passes the light blocking device when a color temperature of the external light is within a predetermined range, and close the light blocking device to block the external light when the color temperature of the external light is out of the predetermined range.

In accordance with another embodiment, a method for controlling a display apparatus include: obtaining, by an optical sensor, illuminance of an external light; comparing, by a controller, the illuminance of the external light with a reference value; opening, by the controller, a light blocking device disposed between a light collector configured to collect the external light and a backlight unit so that the external light passes through the light blocking device when the illuminance of the external light is equal to or greater than a reference value; and turning on, by the controller, an auxiliary light source when the illuminance of the external light is less than the reference value.

The method may further include closing, by the controller, the light blocking device to prevent light leakage of the auxiliary light source when the illuminance of the external light is less than the reference value.

The method may further include controlling, by the controller, the light blocking device based on the illuminance of the external light to adjust an amount of the external light transmitted to the backlight unit when the illuminance of the external light is equal to or greater than the reference value.

The method may further include determining, by the controller, whether or not a color temperature of the external light is within a predetermined range; opening, by the controller, the light blocking device so that the external light passes through the light blocking device when the color temperature of the external light is in the predetermined range; and closing, by the controller, the light blocking device to block the external light when the color temperature of the external light is out of the predetermined range.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Embodiments described in the present disclosure may be modified in various different ways at the time of filing of the present application to replace the embodiments and drawings of the present disclosure.

In addition, the same reference numerals or signs shown in the drawings of the present disclosure indicate elements or components performing substantially the same function.

The terms used herein are used to describe the embodiments and are not intended to limit and/or restrict the present disclosure. The singular forms "a," "an" and "the" are intended to include the plural forms as well, unless the context clearly indicates otherwise. In this present disclosure, the terms "including," "having," and the like are used to specify features, numbers, steps, operations, elements, components, or combinations thereof, but do not preclude the presence or addition of one or more of the features, numbers, steps, operations, elements, components, or combinations thereof.

In addition, terms such as "~part," "~unit," "~block," "~member," "~module," etc., may refer to a unit for processing at least one function or operation. For example, the terms may refer to at least one piece of hardware such as a field-programmable gate array (FPGA), an application specific integrated circuit (ASIC), etc. at least one piece of software stored in a memory, or at least one process which is processed by a processor.

The symbols attached to the steps are used to identify the steps. These symbols do not indicate the order between the steps. Each step is performed in an order different from the stated order unless the context clearly indicates a specific order.

Reference will now be made in detail to embodiments of the present disclosure, examples of which are illustrated in the accompanying drawings.

Figure 1:
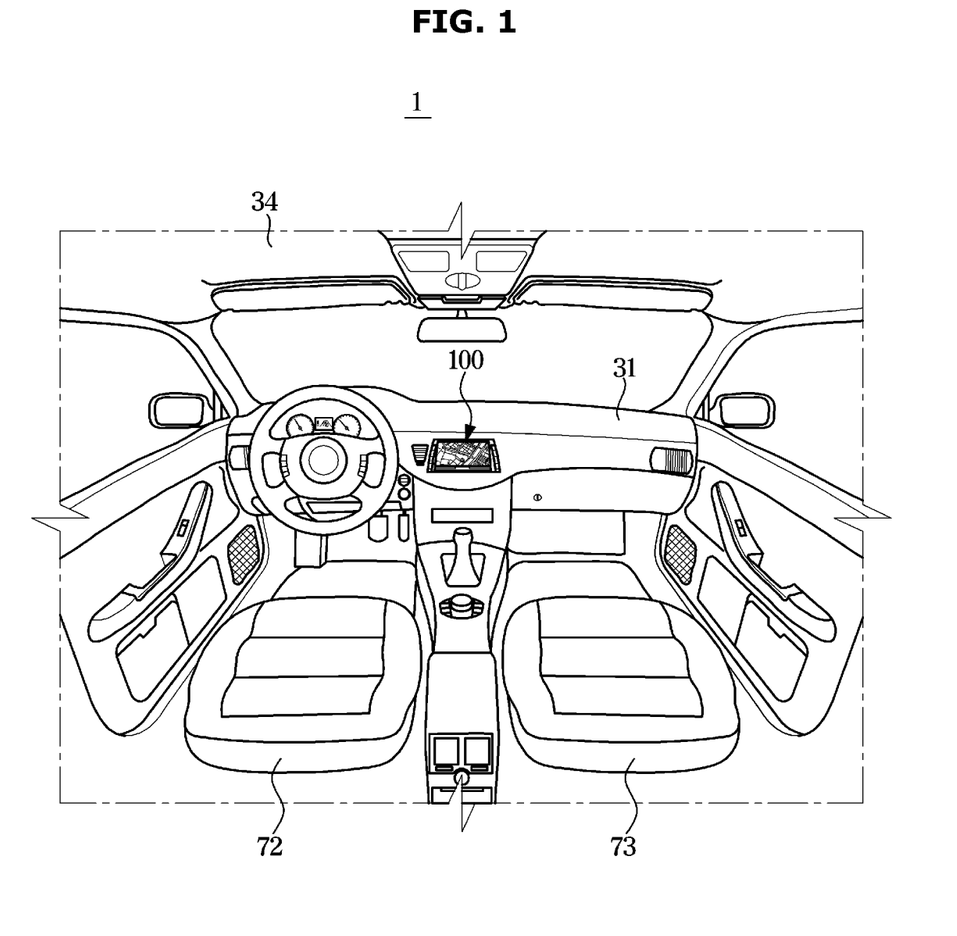
FIG. 1 is a view illustrating an interior of a vehicle.
Figure 2:
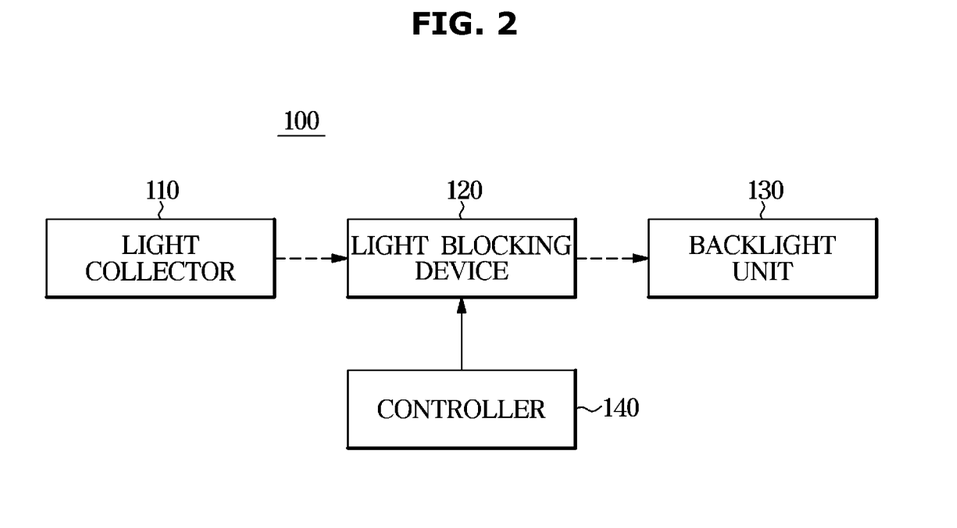
FIG. 2 is a control block diagram of a vehicle.
Figure 3:
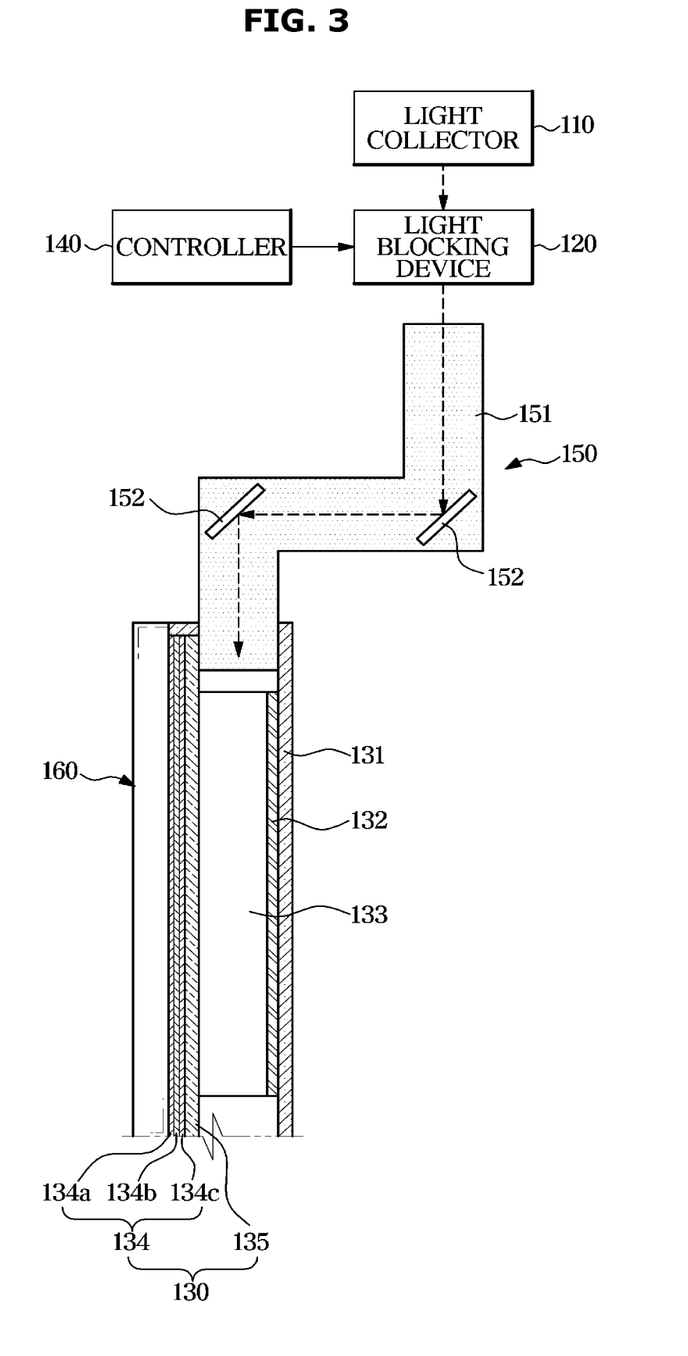
FIG. 3 is a view schematically illustrating a side cross-section of a display apparatus.

FIG. 1 is a view illustrating an interior of a vehicle in accordance with an embodiment of the disclosure. FIG. 2 is a control block diagram of a vehicle in accordance with an embodiment of the disclosure. FIG. 3 is a view schematically illustrating a side cross-section of a display apparatus in accordance with an embodiment of the disclosure.

A display apparatus 100 according to an embodiment may process and output video signals and audio signals, and may display a screen desired for performing an audio function, a video function, a navigation function, a call function, etc.

As illustrated in FIG. 1, the display apparatus 100 may be provided in a center fascia, which is a central area of a dashboard 31.

In one form, the display apparatus 100 may be provided at the rear of a driver's seat 72 or a passenger seat 73 or a headliner 34 inside a vehicle 1 and used by passengers on a rear seat.

The display apparatus 100 may be referred to as a head unit or may be referred to as an audio video navigation (AVN) device. Regardless of its name or position, the display apparatus provided in the vehicle may be the display apparatus 100 according to an embodiment.

Referring to FIGS. 2 and 3, the display apparatus 100 includes: a display panel 160; a backlight unit 130 disposed at a rear part of the display panel 160 and configured to supply light; a light collector 110 configured to collect external light and connected to the backlight unit 130; a light blocking device 120 disposed between the backlight unit 130 and the light collector 110 and configured to pass or block light; and a controller 140 configured to determine whether an external light use condition is satisfied based on illuminance of the external light, and open the light blocking device 120 so that the external light is transmitted to the backlight unit 130 when the external light use condition is satisfied.

The light collector 110 may include a light collecting lens or a light receiving film that collects light, and may further include a light collecting prism according to a design. A structure of the light collector 110 will be described later.

The light collected by the light collector 110 may be external light. Here, the external light may refer to light whose light source is outside the vehicle 1. The external light may include natural light and artificial light emitted from a street light, another vehicle, a neon sign, etc.

The light collected by the light collector 110 may be supplied to the backlight unit 130, and a light guide unit 150 which serves as a light path may be disposed between the light collector 110 and the backlight unit 130.

For example, the light guide unit 150 may include a light guide pipe 151 and at least one mirror 152. When the light collected by the light collector 110 flows into the light guide unit 150, the incoming light travels through the light guide pipe 151, and the travel path thereof is as indicated by a dotted line of FIG. 3.

The light guide pipe 151 may be bent depending on a position of the light collector 110 and the backlight unit 130 or a distance therebetween. In this case, the mirror 152 may be disposed at a bent point as shown in FIG. 3 so that light passing through the light guide pipe 151 may flow into the backlight unit 130.

FIG. 3 is an example of the structure of the light guide unit 150. If the light collected by the light collector 110 is supplied to the backlight unit 130 in other structures, those structures may be applied to the light guide unit 150. As another example, the light guide unit 150 may be formed using a photoconductive light guide film or an optical fiber.

The light blocking device 120 may be provided between the light collector 110 and the light guide unit 150 and pass or block light from the light collector 110 to the light guide unit 150.

The light blocking device 120 may be provided in the form of a shutter that can open and be closed. The light blocking device 120 may have a structure in which a degree of opening is adjustable when the light blocking device 120 opens. When the light blocking device 120 opens, the light collected by the light collector 110 may enter the light guide unit 150 through the light blocking device 120.

The backlight unit 130 may be disposed behind the display panel 160. Here, the direction behind of the display panel 160 refers to a direction opposite to a direction in which the screen is displayed.

The backlight unit 130 may include an optical plate 134, a diffuser plate 135, a substrate 131, a light guide plate 133, and a reflecting plate 132. Depending on the design, some of them may be omitted, and other configurations may be added in addition to them.

The optical plate 134 may include at least one diffusion sheet 134c, at least one prism sheet 134b, and at least one protective sheet 134a.

The at least one diffusion sheet 134c may cancel the pattern of the diffuser plate 135 that diffuses incident light, and the at least one prism sheet 134b may refract the light diffused in the diffusion sheet 134c so that the light is incident perpendicularly to the display panel 160. For example, a prism may be arranged in a predetermined pattern on a surface of the prism sheet 134b.

The protective sheet 134a may protect the diffusion sheet 134c and the prism sheet 134b from external stimuli or foreign substances.

Light supplied from the light collector 110 through the light guide unit 150 may flow into the side surface of the light guide plate 133 installed on the substrate 131. The light introduced into the light guide plate 133 may be evenly incident on the rear surface of the display panel 160 by totally reflecting and traveling inside the light guide plate 133.

The controller 140 may control the opening and closing of the light blocking device 120. When the controller 140 opens the light blocking device 120, the light may travel between the light collector 110 and the light guide unit 150. When the controller 140 closes the light blocking device 120, traveling of the light may be blocked between the light collector 110 and the light guide unit 150.

The controller 140 may open the light blocking device 120 when the external light use condition is satisfied. Here, whether or not the external light use condition is satisfied may be determined based on the illuminance of the external light. For example, the controller 140 may determine that the external light use condition is satisfied when the illuminance of the external light is greater than or equal to a reference value, and determine that the external light use condition is not satisfied when the illuminance of the external light is less than the reference value.

That is, the controller 140 may open the light blocking device 120 and use the external light collected by the light collector 110 as a light source of the backlight unit 130 under a high illuminance condition in which the illuminance of the external light is greater than or equal to the reference value. The controller 140 may close the light blocking device 120 and not use the external light collected by the light collector 110 as a light source of the backlight unit 130 under a low illuminance condition in which the illuminance of the external light is less than the reference value.

In addition, when using the external light as the light source of the backlight unit 130, in the case that the illuminance of the external light is too high, an amount or brightness of the external light may be adjusted by adjusting the opening degree of the light blocking device 120. Therefore, in the case that the illuminance of the external light is greater than or equal to the reference value, the controller 140 may adjust the opening degree of the light blocking device 120 differently according to the illuminance of the external light.

The controller 140 may include at least one memory in which programs for performing the operations described above or operations described later are stored, and at least one processor for executing the stored programs. The at least one memory and the at least one processor may be integrated on one chip, or may be provided at physically separate locations.

As such, when the external light is greater than a predetermined illuminance, by using the external light as the light source of the backlight unit 130, the visibility of the display panel 160 may be improved while maximizing the utilization of natural light, which is an infinite resource. Also, problems caused by artificially raising the brightness of an LED light source of the backlight unit can be avoided.

Figure 4:
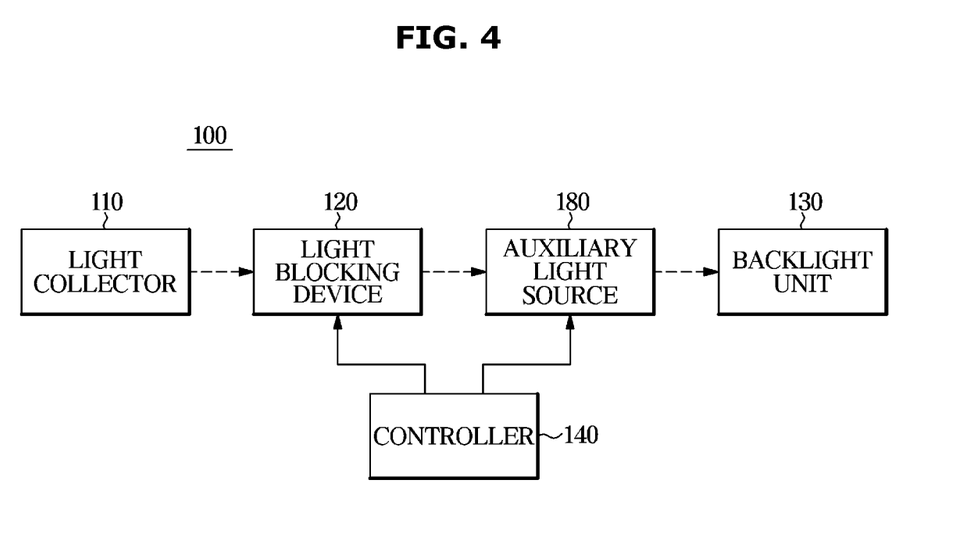
FIG. 4 is a control block diagram of a display apparatus including an auxiliary light source.
Figure 5:
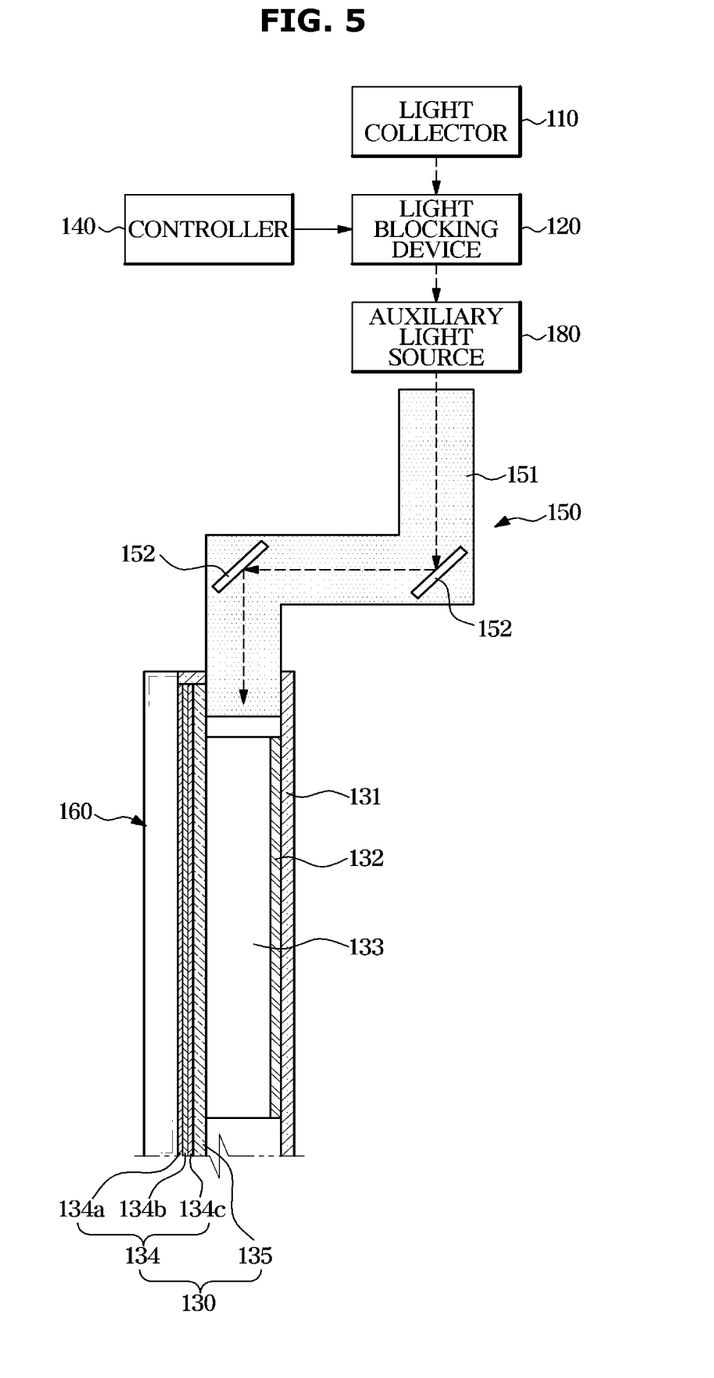
FIG. 5 is a schematic side view illustrating a structure of a display apparatus including an auxiliary light source.

FIG. 4 is a control block diagram of a display apparatus including an auxiliary light source in accordance with an embodiment of the disclosure and FIG. 5 is a schematic side view illustrating a structure of a display apparatus including an auxiliary light source in accordance with an embodiment of the disclosure.

Referring to FIGS. 4 and 5, the display apparatus 100 may further include an auxiliary light source 180 configured to supply light to the backlight unit 130.

For example, the auxiliary light source 180 may be an LED light source, and may be disposed between the light blocking device 120 and the light guide unit 150, as shown in FIG. 5. However, such structure is merely an example, and it is possible that the auxiliary light source 180 is disposed in the light guide unit 150. Alternatively, it is also possible that the auxiliary light source 180 is disposed at a side opposite to a side to which the light guide unit 150 is connected among both sides of the backlight unit 130. If the light can be supplied to the side of the backlight unit 130, there is no other restriction regarding a location of the auxiliary light source 180.

The auxiliary light source 180 may be used as the light source of the backlight unit 130 when the illuminance of the external light is less than the reference value. Therefore, the controller 140 may turn on the auxiliary light source 180 when the illuminance of the external light is less than the reference value. On the contrary, when the illuminance of the external light is greater than or equal to the reference value, the auxiliary light source 180 may be turned off and the external light may be used as the light source of the backlight unit 130 as described above.

In addition, the controller 140 may close the light blocking device 120 when the auxiliary light source 180 is turned on. When the light blocking device 120 is closed, light emitted from the auxiliary light source 180 may be prevented from leaking in a direction opposite to the backlight unit 130 in order to avoid a loss of light.

As another example, in the case that the external light is not bright enough to supply light alone, but it is possible to be used together with the auxiliary light source 180, some of the light desired for the backlight unit 130 may be supplied from the external light, and remaining light may be supplied from the auxiliary light source 180. In this case, the controller 140 may turn on the auxiliary light source 180 when the illuminance of the external light is less than a first reference value and is greater than or equal to a second reference value, and also open the light blocking device 120 to use both the auxiliary light source 180 and the external light as the light source.

In response to the illuminance of the external light being lower than the second reference value, the controller 140 may turn on the auxiliary light source 180 and close the light blocking device 120 to block leakage of the light from the auxiliary light source 180 as described above.

In addition, the controller 140 may adjust the illuminance of the auxiliary light source 180 based on the illuminance of the external light. For example, the controller 140 may adjust the illuminance of the auxiliary light source 180 to be lower as the illuminance of the external light becomes higher. As a specific example, the illuminance of the auxiliary light source 180 under the condition in which the illuminance of the external light is less than the first reference value and is greater than or equal to the second reference value may be adjusted lower than the illuminance of the auxiliary light source 180 under the condition in which the illuminance of the external light is less than the second reference value.

The first reference value is greater than the second reference value. The reference value in the foregoing example may be set to a value independent of the first reference value and the second reference value in this example, or may be set to be the same as the first reference value.

Figure 6:
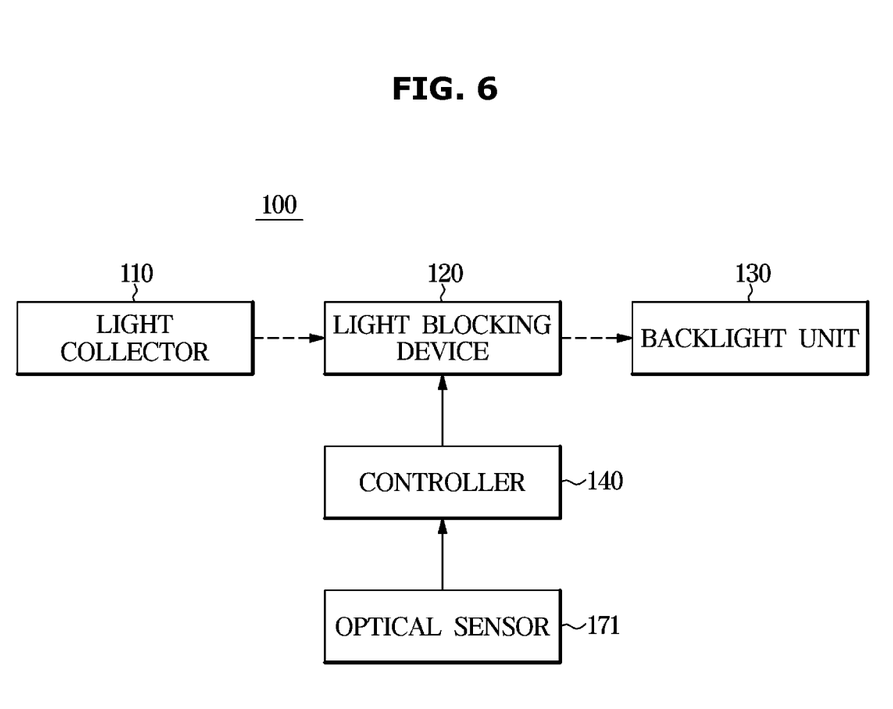
FIG. 6 is a control block diagram of a display apparatus including an optical sensor.

FIG. 6 is a control block diagram of a display apparatus including an optical sensor in accordance with an embodiment of the disclosure.

As described above, the controller 140 may open or close the light blocking device 120 based on the illuminance of the external light. To this end, as shown in FIG. 6, an optical sensor 171 configured to measure illuminance may be included in the display apparatus 100.

Alternatively, it is also possible to obtain the illuminance of the external light in another manner not using the optical sensor 171. For example, it is also possible to receive current location information, time information, weather information in the current location, street light information or neon sign information around the current location from an external server, and calculate the illuminance of the external light using the received information. As another example, when a camera provided in the vehicle 1 captures an external image around the vehicle 1, it is also possible to calculate the illuminance of the external light based on the captured external image.

Figure 7:
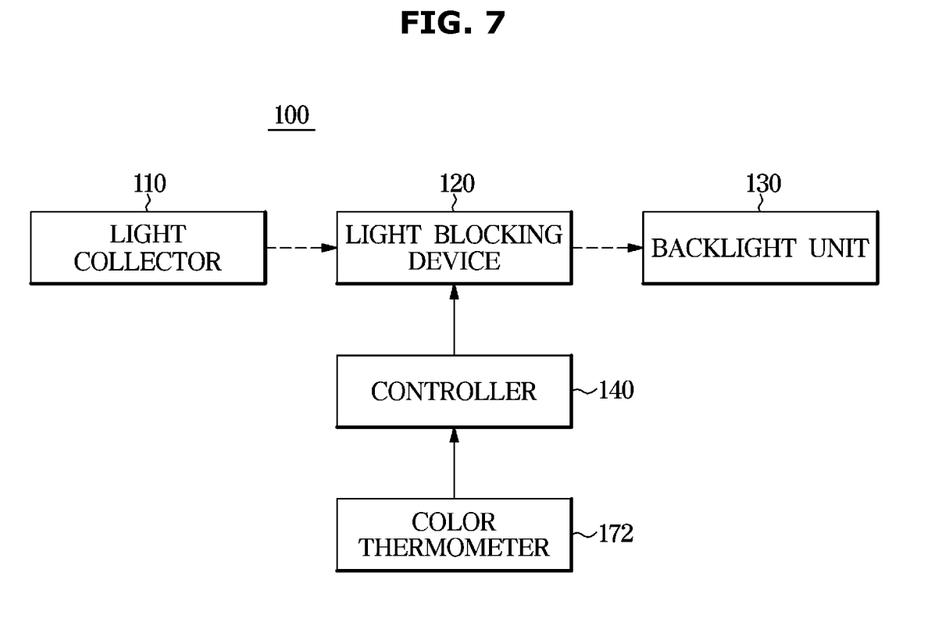
FIG. 7 is a control block diagram of a display apparatus including a color thermometer.

FIG. 7 is a control block diagram of a display apparatus including a color thermometer in accordance with an embodiment of the disclosure.

The display apparatus 100 according to an embodiment may not use the external light as the light source of the backlight unit 130 even in the condition that the illumination of the external light is high enough to be used as the light source of the backlight unit 130, in the case that the external light is out of the range of the white light due to sunset, red street light, neon sign, etc.

To this end, a color thermometer 172 configured to measure a color temperature of the external light may be further included in the display apparatus 100. The controller 140 may open the light blocking device 120 so that the external light passes through the light blocking device 120 in response to the color temperature of the external light measured by the color thermometer 172 being included in a predetermined range. Alternatively, in response to the color temperature of the external light measured by the color thermometer 172 being out of the predetermined range, the controller 140 may close the light blocking device 120 to block the inflow of the external light and turn on the auxiliary light source 180.

The predetermined range may represent a color temperature range of the white light. For example, a range of 5,000 to 10,000K may be set to the color temperature range of the white light, or the narrower range included in this range may be set to the color temperature range of the white light.

Alternatively, it is also possible to obtain the color temperature of the external light in another manner not using the color thermometer 172. For example, it is also possible to receive current location information, time information, weather information in the current location, street light information or neon sign information around the current location from an external server, and calculate the color temperature of the external light using the received information. As another example, when the camera provided in the vehicle 1 captures an external image around the vehicle 1, it is also possible to calculate the color temperature of the external light based on the captured external image.

FIGS. 8A, 8B, 8C and 9 are views illustrating examples of a structure of a light collector of a display apparatus in accordance with an embodiment of the disclosure.

Figure 8A:
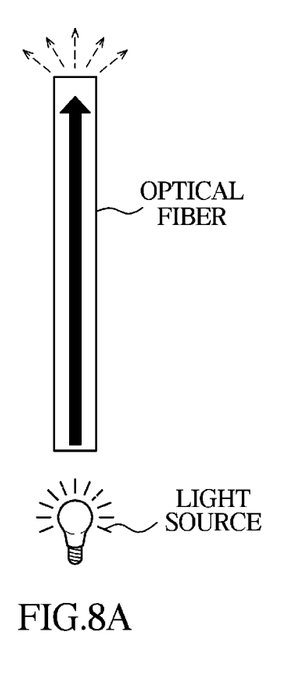
FIGS. 8A, 8B, 8C and 9 are views illustrating examples of a structure of a light collector of a display apparatus.

Referring to FIG. 8A, unless a certain treatment is applied to the surface of an optical fiber, light emitted from a light source positioned at one end of the optical fiber passes through the optical fiber, and most of the light reaches the other end of the optical fiber and diffuses.

Figure 8B:
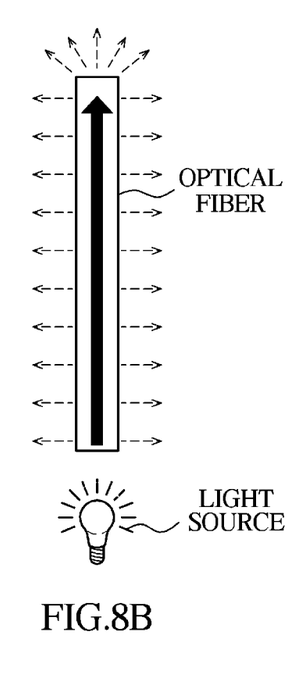

On the other hand, in the case that the corrosion treatment is applied to the surface of the optical fiber, diffused reflection occurs at the surface of the optical fiber and the light is scattered, and only a part of the light reaches the other end of the optical fiber and diffuses.

Figure 8C:
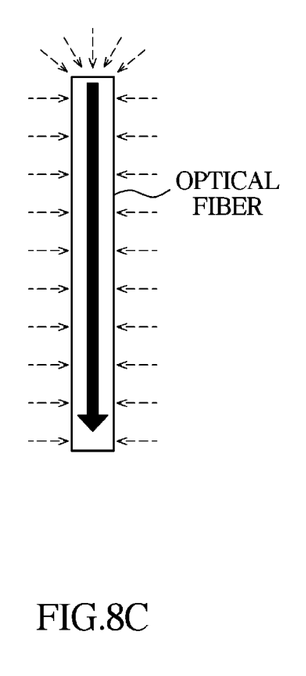

Using this principle in reverse, by placing the optical fiber having the surface to which the corrosion treatment is applied under natural light, it is possible to collect the natural light emitted from all directions of the optical fiber as shown in FIG. 8C.

Figure 9:
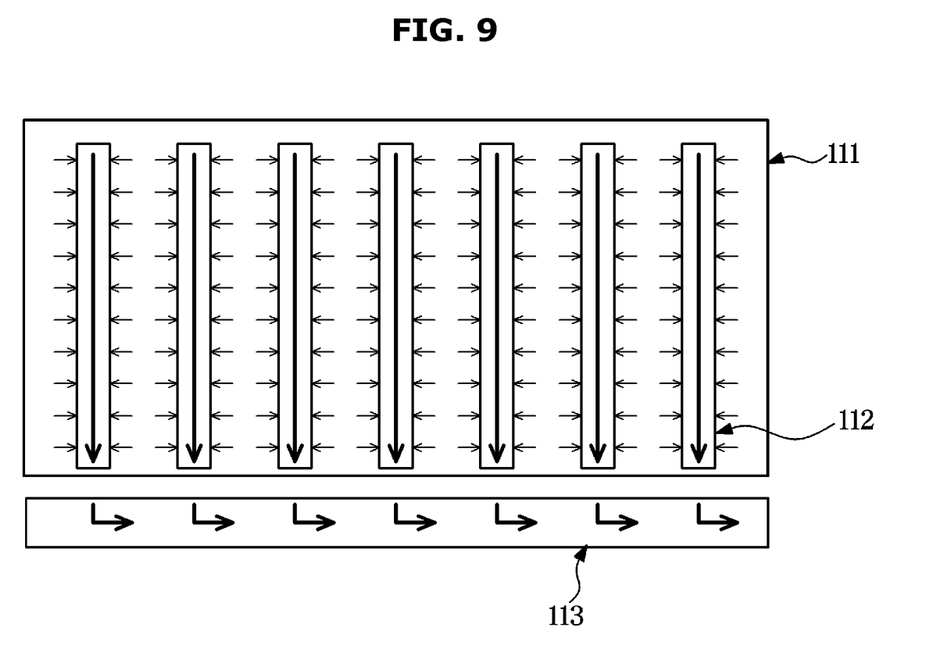

Therefore, as shown in FIG. 9, the light collector 110 may have a structure in which at least one optical fiber 112 subjected to the surface corrosion treatment is distributed on an optical film 111. In addition, a prism 113 disposed at the end of the optical fiber 112 may redirect the light transmitted from the optical fiber 112 toward the light guide unit 150 by refracting the light transmitted from the optical fiber 112.

In addition, the prism sheet 134b provided in the backlight unit 130 may refract the light emitted from the light guide plate 133 and the refracted light may be incident on the display panel 160 vertically.

However, the structure of FIG. 9 is merely an example applicable to the display apparatus 100 according to an embodiment. Apart from the structure of FIG. 9, if any structure is able to collect the external light, that structure may be employed as the light collector 110.

Hereinafter, the method for controlling the display apparatus according to an embodiment will be described. The display apparatus 100 described above may be used to perform the method for controlling a dialogue system according to an embodiment. Therefore, the above description regarding the display apparatus 100 may be applied to an embodiment of the method for controlling the display apparatus 100 even if there is no specific mention.

Figure 10:
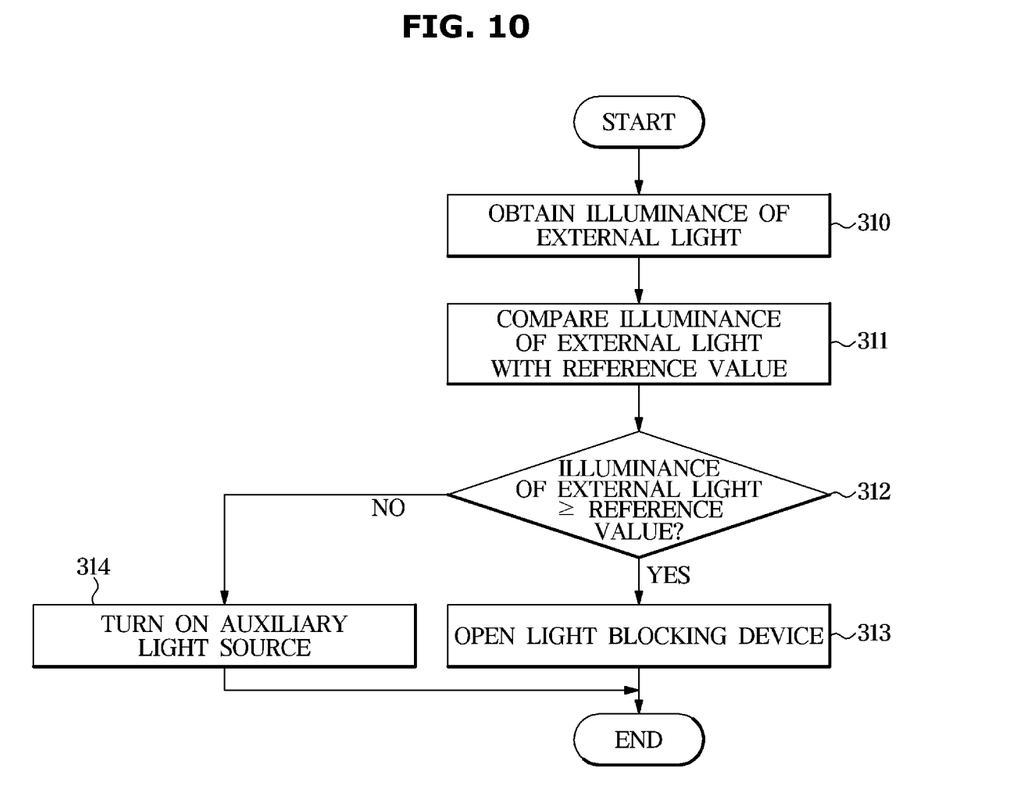
FIGS. 10 and 11 are flowcharts illustrating a method for controlling a display apparatus.
Figure 11:
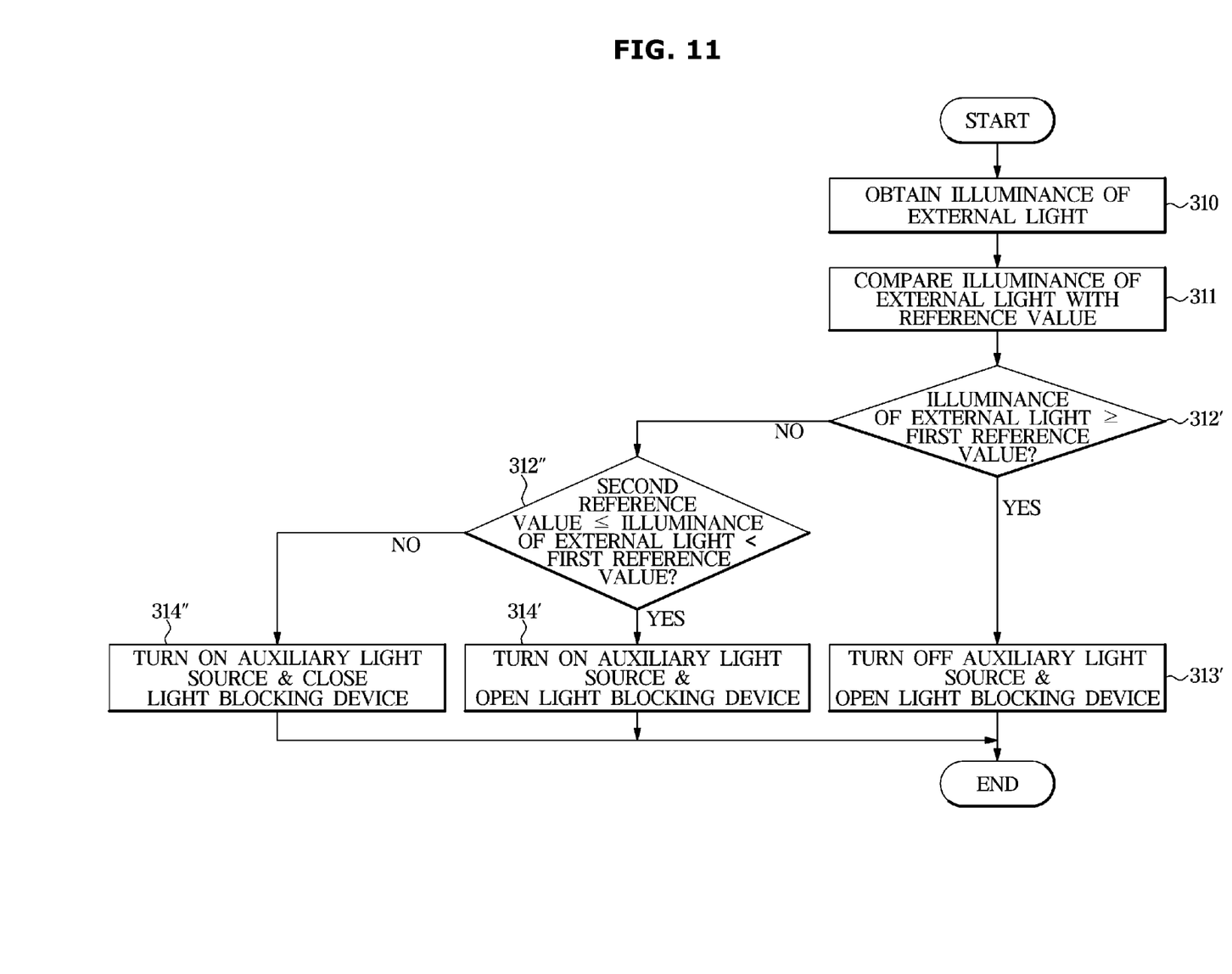

FIGS. 10 and 11 are flowcharts illustrating a method for controlling a display apparatus in accordance with an embodiment of the disclosure.

The method for controlling the display apparatus according to an embodiment may include determining whether the external light use condition is satisfied, and using the external light of the vehicle 1 as the light source of the backlight unit 130. In this example, whether or not the illuminance of the external light is greater than or equal to the reference value may be set as the external light use condition.

According to the embodiment shown in FIG. 10, the method for controlling the display apparatus may include obtaining the illuminance of the external light (310), and comparing the illuminance of the external light with the reference value (311). The method may further include, in response to the illuminance of the external light being greater than or equal to the reference value (YES in 312), opening the light blocking device 120 (313) so that the external light passes through the light blocking device 120. Also, the method may further include, in response to the illuminance of the external light being less than the reference value (NO in 312), turning on the auxiliary light source 180 (314).

The external light passing through the light blocking device 120 may flow into the backlight unit 130 through the light guide unit 150, and the backlight unit 130 may supply the light to the display panel 160.

In addition, when using the external light as the light source of the backlight unit 130, the opening degree of the light blocking device 120 may be controlled in order to adjust the amount or brightness of the external light supplied to the backlight unit 130, in the case that the illuminance of the external light is too high. Therefore, when the illuminance of the external light is greater than or equal to the reference value, the degree of opening of the light blocking device 120 may be differently controlled according to the illuminance of the external light.

The auxiliary light source 180 may be disposed between the light blocking device 120 and the light guide unit 150 or may be disposed in the light guide unit 150. Alternatively, it is also possible that the auxiliary light source 180 is disposed at a side opposite to a side to which the light guide unit 150 is connected among both sides of the backlight unit 130. For any position in which the auxiliary light source 180 is able to be used as the light source of the backlight unit 130, that position may be applied to the embodiment.

In addition, the light blocking device 120 may be closed when the auxiliary light source 180 is turned on. When the light blocking device 120 is closed, light emitted from the auxiliary light source 180 may be prevented from leaking in the opposite direction of the backlight unit 130 to avoid a loss of light.

As another example, in the case that the external light is not bright enough to supply light alone, but it is possible to be used together with the auxiliary light source 180, some of the light desired for the backlight unit 130 may be supplied from the external light, and the remaining light may be supplied from the auxiliary light source 180. In this case, as shown in FIG. 11, the method may include when the illuminance of the external light is less than the first reference value and is greater than or equal to the second reference value (YES in 312"), turning on the auxiliary light source 180, and also opening the light blocking device 120 (314') to use both the auxiliary light source 180 and the external light as the light source.

The method may further include when the illuminance of the external light is equal to or greater than the first reference value (YES in 312"), turning off the auxiliary light source 180 and opening the light blocking device 120 (313') to use the external light as the light source.

Furthermore, the method may further include when the illuminance of the external light is less than the second reference value (NO in 312"), turning on the auxiliary light source 180 and closing the light blocking device 120 (314") so that only the auxiliary light source 180 is used as the light source and the light leakage of the auxiliary light source 180 is prevented.

It is also possible to adjust the illuminance of the auxiliary light source 180 based on the illuminance of the external light. For example, as the illuminance of the external light becomes higher, the illuminance of the auxiliary light source 180 may be adjusted to be lower. In more detail, the illuminance of the auxiliary light source 180 under the condition in which the illuminance of the external light is less than the first reference value and is greater than or equal to the second reference value may be adjusted lower than the illuminance of the auxiliary light source 180 under the condition in which the illuminance of the external light is less than the second reference value.

Meanwhile, the illuminance of the external light may be measured by the optical sensor 171, or may be calculated based on the current location of the vehicle 1 and current weather provided from an external server, current time, photographed external image, etc.

Comparing the illuminance of the external light with the reference value and controlling the light blocking device 120 according to the comparison result may be performed by the controller 140 of the display apparatus 100.

Figure 12:
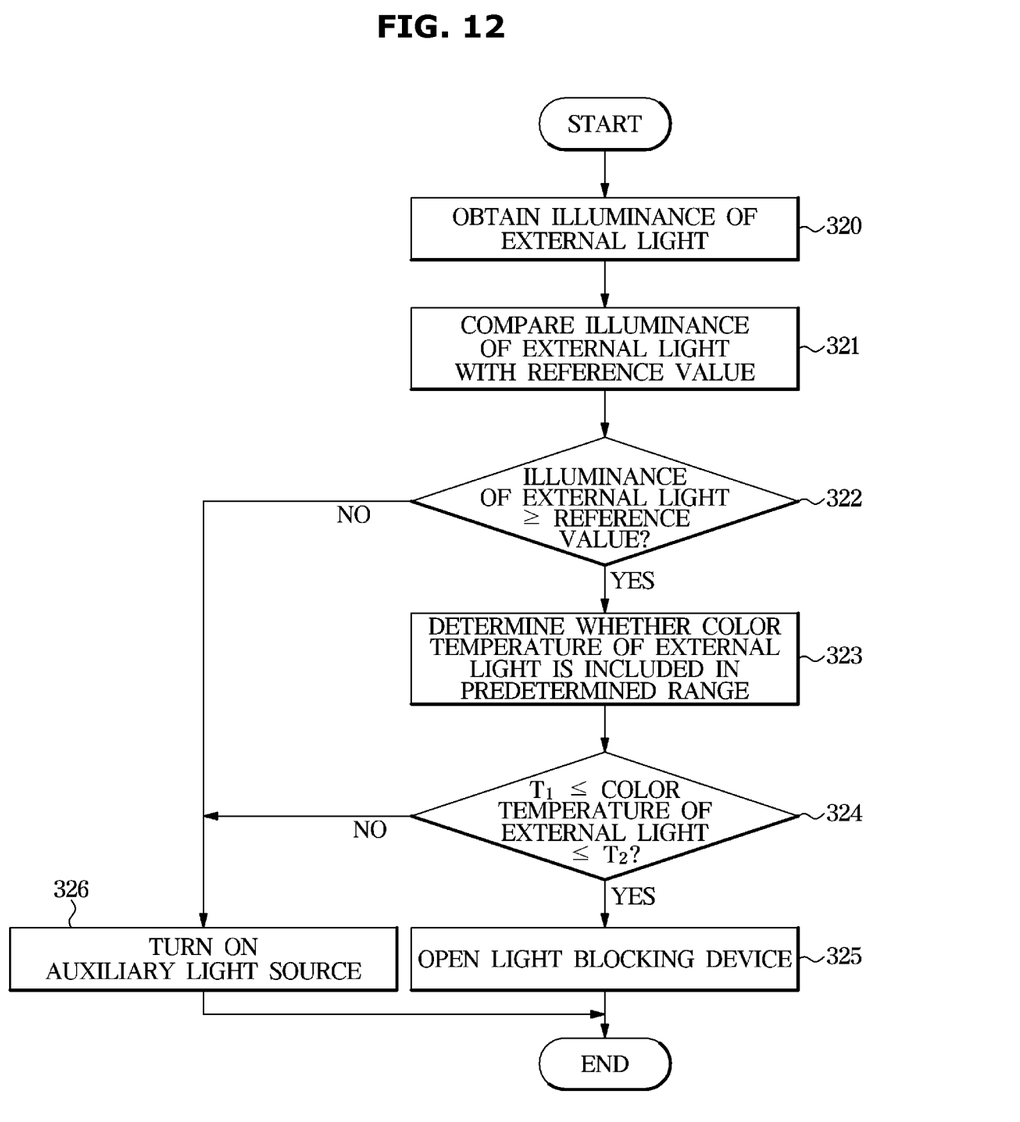
FIG. 12 is another flowchart illustrating a method for controlling a display apparatus.

FIG. 12 is another flowchart illustrating a method for controlling a display apparatus in accordance with an embodiment of the disclosure.

The color temperature of the external light may be included in the external light use condition in the method for controlling the display apparatus according to an embodiment. Accordingly, in the case that the external light is out of the range of the white light due to sunset, red street light, neon sign, etc., the external light may not be used as the light source of the backlight unit 130 even in the condition that the illumination of the external light is high enough to be used as the light source of the backlight unit 130.

Referring to FIG. 12, the method according to an embodiment may include obtaining the illuminance of the external light (320), and comparing the illuminance of the external light with the reference value (321). The method may further include when the illuminance of the external light is greater than or equal to the reference value (YES in 322), determining whether or not the color temperature of the external light is included in a predetermined range T1 to T2 (323). The predetermined range may represent the color temperature range of the white light. For example, a range of 5,000 to 10,000K may be set to the color temperature range of the white light, or the narrower range included in this range may be set to the color temperature range of the white light.

The method may further include when the color temperature of the external light is included within the range T1 to T2 (YES in 324), opening the light blocking device 120 (325) so that the external light passes, and when the color temperature of the external light is out of the predetermined range (NO in 324), turning on the auxiliary light source 180 (326).

The color temperature of the external light may be measured by using the color thermometer 172. Alternatively, it is also possible to receive current location information, time information, weather information in the current location, street light information or neon sign information around the current location from an external server, and calculate the color temperature of the external light using the received information. As another example, when the camera provided in the vehicle 1 captures an external image around the vehicle 1, it is also possible to calculate the color temperature of the external light based on the captured external image.

According to the aforementioned display apparatus, the vehicle having the same, and the method for controlling the display apparatus, natural light, which is an infinite resource, is used as the light source of the backlight unit, thereby improving the visibility of the display panel and solving problems such as deterioration of life of the conventional LED light source, heat generation, and the like The embodiments of the display apparatus, the vehicle having the same and the method for controlling the display apparatus have been disclosed with reference to the accompanying drawings. Those skilled in the art will understand that the present disclosure can be implemented in a form different from the disclosed embodiments without changing the subject matter or essential features of the present disclosure. The disclosed embodiments are illustrative and the scope of the present disclosure should not be construed as limited by the disclosed embodiments.

What is claimed is:

1. A display apparatus comprising:
    a display panel;
    a backlight unit disposed at a rear part of the display panel and configured to supply light to the display panel;
    a light collector configured to collect external light and connected to the backlight unit;
    a light blocking device disposed between the backlight unit and the light collector and configured to pass or block light;
    an auxiliary light source disposed between the backlight unit and the light blocking device and configured to supply light to the backlight unit; and
    a controller configured to:
        determine whether an external light use condition is satisfied based on illuminance of the external light, and
        open the light blocking device such that the external light is transmitted to the backlight unit when the external light use condition is satisfied.

2. The display apparatus according to claim 1,
    wherein the controller is configured to turn off the auxiliary light source when the external light use condition is satisfied, and configured to turn on the auxiliary light source when the external light use condition is not satisfied.

3. The display apparatus according to claim 2, wherein the controller is configured to close the light blocking device to prevent light leakage of the auxiliary light source when the external light use condition is not satisfied.

4. The display apparatus according to claim 2, wherein the controller is configured to turn on the auxiliary light source and open the light blocking device when the illuminance of the external light is less than a first reference value and equal to or greater than a second reference value.

5. The display apparatus according to claim 4, wherein the controller is configured to adjust illuminance of the auxiliary light source to be lower as the illuminance of the external light becomes higher.

6. The display apparatus according to claim 1, wherein the controller is configured to:
    determine that the external light use condition is satisfied when the illuminance of the external light is equal to or greater than a reference value, and
    determine that the external light use condition is not satisfied when the illuminance of the external light is less than the reference value.

7. The display apparatus according to claim 6, wherein the controller is configured to:
    control the light blocking device based on the illuminance of the external light, and adjust an amount of the light transmitted to the backlight unit when the external light use condition is satisfied.

8. The display apparatus according to claim 6, wherein the controller is configured to:
open the light blocking device such that the external light passes the light blocking device when a color temperature of the external light is within a predetermined range, and
close the light blocking device to block the external light when the color temperature of the external light is out of the predetermined range.

9. The display apparatus according to claim 8, further comprising:
a color thermometer configured to measure the color temperature of the external light.

10. The display apparatus according to claim 6, further comprising:
an optical sensor configured to measure the illuminance of the external light.

11. The display apparatus according to claim 6, wherein the controller is configured to determine the illuminance of the external light based on at least one of location information of a vehicle including the display apparatus, weather information, a captured external image, or time information.

12. The display apparatus according to claim 11, wherein the controller is configured to determine a color temperature of the external light based on the captured external image.

13. The display apparatus according to claim 1, wherein the light collector comprises at least one optical fiber having a surface to which a corrosion treatment is applied.

14. A vehicle comprising:
a display panel;
a backlight unit disposed at a rear part of the display panel and configured to supply light to the display panel;
a light collector configured to collect external light and connected to the backlight unit;
a light blocking device disposed between the backlight unit and the light collector and configured to pass or block light;
an auxiliary light source disposed between the backlight unit and the light blocking device and configured to supply light to the backlight unit; and
a controller configured to:
determine whether an external light use condition is satisfied based on illuminance of the external light, and
open the light blocking device such that the external light is transmitted to the backlight unit when the external light use condition is satisfied.

15. The vehicle according to claim 14,
wherein the controller is configured to:
turn off the auxiliary light source when the external light use condition is satisfied, and
turn on the auxiliary light source when the external light use condition is not satisfied.

16. The vehicle according to claim 15, wherein the controller is configured to close the light blocking device to prevent light leakage of the auxiliary light source when the external light use condition is not satisfied.

17. The vehicle according to claim 14, wherein the controller is configured to:
determine that the external light use condition is satisfied when the illuminance of the external light is equal to or greater than a reference value, and
determine that the external light use condition is not satisfied when the illuminance of the external light is less than the reference value.

18. The vehicle according to claim 14, wherein the controller is configured to:
open the light blocking device such that the external light passes the light blocking device when a color temperature of the external light is within a predetermined range, and
close the light blocking device to block the external light when the color temperature of the external light is out of the predetermined range.

19. A method for controlling a display apparatus, the method comprising:
obtaining, by an optical sensor, illuminance of an external light;
comparing, by a controller, the illuminance of the external light with a reference value;
opening, by the controller, a light blocking device disposed between a light collector configured to collect the external light and a backlight unit so that the external light passes through the light blocking device when the illuminance of the external light is equal to or greater than a reference value; and
when the illuminance of the external light is less than the reference value, turning on, by the controller, an auxiliary light source disposed between the backlight unit and the light blocking device, and supplying light to the backlight unit.

20. The method according to claim 19, further comprising:
closing, by the controller, the light blocking device to prevent light leakage of the auxiliary light source when the illuminance of the external light is less than the reference value.

21. The method according to claim 19, further comprising:
controlling, by the controller, the light blocking device based on the illuminance of the external light to adjust an amount of the external light transmitted to the backlight unit when the illuminance of the external light is equal to or greater than the reference value.

22. The method according to claim 19, further comprising:
determining, by the controller, whether or not a color temperature of the external light is within a predetermined range;
opening, by the controller, the light blocking device so that the external light passes through the light blocking device when the color temperature of the external light is in the predetermined range; and
closing, by the controller, the light blocking device to block the external light when the color temperature of the external light is out of the predetermined range.

* * * * *